United States Patent
Shin et al.

(10) Patent No.: US 7,876,533 B2
(45) Date of Patent: Jan. 25, 2011

(54) STAINLESS STEEL BALANCER HAVING RECESS FORMED AT A SIDE SURFACE, AND HEAD STACK ASSEMBLY WITH THE SAME

(75) Inventors: Sang-chul Shin, Seongnam-si (KR); Woo-cheol Jeong, Anyang-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 889 days.

(21) Appl. No.: 11/704,270

(22) Filed: Feb. 9, 2007

(65) Prior Publication Data

US 2007/0188928 A1    Aug. 16, 2007

(30) Foreign Application Priority Data

Feb. 10, 2006  (KR) .................... 10-2006-0012880

(51) Int. Cl.
   G11B 5/55   (2006.01)
   G11B 21/08  (2006.01)
(52) U.S. Cl. .................................. 360/265.8
(58) Field of Classification Search ............ 360/265.8
   See application file for complete search history.

(56) References Cited

U.S. PATENT DOCUMENTS

| | | | | |
|---|---|---|---|---|
| 5,305,169 A | | 4/1994 | Anderson et al. | 360/256.2 |
| 5,709,700 A | * | 1/1998 | Hirota | 606/188 |
| 5,867,348 A | * | 2/1999 | Suwa | 360/265.2 |
| 6,487,036 B1 | | 11/2002 | Horning et al. | 360/97.01 |
| 6,940,699 B2 | * | 9/2005 | Yuki et al. | 360/265.2 |
| 7,583,476 B2 | * | 9/2009 | Hanrahan et al. | 360/265.6 |
| 2002/0063999 A1 | * | 5/2002 | Huang et al. | 360/265.7 |
| 2003/0076633 A1 | * | 4/2003 | Macpherson et al. | 360/265.7 |
| 2003/0128477 A1 | * | 7/2003 | Macpherson et al. | 360/265.7 |
| 2005/0057857 A1 | * | 3/2005 | Kawakami et al. | 360/256.4 |
| 2007/0014052 A1 | * | 1/2007 | Kim et al. | 360/265.7 |

FOREIGN PATENT DOCUMENTS

| | | |
|---|---|---|
| JP | 10-326454 | 12/1998 |
| JP | 2001-11534 A  * | 1/2001 |
| JP | 2001-035099 | 2/2001 |

* cited by examiner

*Primary Examiner*—Julie Anne Watko
(74) *Attorney, Agent, or Firm*—Staas & Halsey LLP

(57) ABSTRACT

A balancer installed on an overmold of an head stack assembly to adjust balance of the head stack assembly is formed of stainless steel and demagnetized through a thermal treatment after the stainless steel is processed to have a balancer shape. The balancer has a recess formed at a side surface of the balancer to prevent separation of the balancer from the overmold. The stainless steel is austenite based stainless steel.

12 Claims, 4 Drawing Sheets

STAINLESS STEEL BALANCER HAVING RECESS FORMED AT A SIDE SURFACE, AND HEAD STACK ASSEMBLY WITH THE SAME

CROSS-REFERENCE TO RELATED APPLICATIONS

This application claims the benefit of Korean Patent Application No. 10-2006-0012880, filed on Feb. 10, 2006, in the Korean Intellectual Property Office, the disclosure of which is incorporated herein in its entirety by reference.

BACKGROUND OF THE INVENTION

1. Field of the Invention

The present invention relates to a hard disk drive, and more particularly, to a balancer for controlling the balance of a head stack assembly (HSA), the HSA having the balance, a method for manufacturing the balancer, and a method for manufacturing an overmold of the HSA.

2. Description of the Related Art

Hard disk drives (HDDs) are auxiliary memory devices used for computers, MP3 players, or mobile phones. The HDD reads or writes data with respect to a disk that is a data storage medium, using a head slider that is a data read/write medium. During the operation of the HDD, the head slider maintains a floating state rising a predetermined distance from the disk and a magnetic head mounted on the head slider reads or writes data with respect to the disk. A device to support the head slider attached on an end portion thereof and moving the same to a predetermined position on the disk is referred to as a head stack assembly (HSA).

The HSA has unbalance due to factors such as allowance in parts or in assembly. The head slider mounted on an end portion of the HSA moves to a particular track as the HSA pivots, and performs reading and writing of data. Unexpected external interference applied to the HDD causes vibrations to the HSA. When a degree of the unbalance of the HSA is great, the vibration of the HSA due to the external interference increases so that a position error signal (PES) characteristic is deteriorated and data processing is delayed or prevented. Thus, a balancing work to reduce the unbalance of the HSA is needed.

SUMMARY OF THE INVENTION

To solve the above and/or other problems, the present invention provides a balancer for controlling the balance of a head stack assembly (HSA), the HSA having the balance, a method for manufacturing the balancer, and a method for manufacturing an overmold of the HSA.

According to an aspect of the present invention, a balancer installed on an overmold of an head stack assembly to adjust balance of the head stack assembly is formed of stainless steel and demagnetized through a thermal treatment after the stainless steel is processed to have a balancer shape.

The demagnetization thermal treatment may include a step to place the stainless steel having a balancer shape at a temperature between 950-1,150° C. for 30-120 minutes.

A hole may be formed in an upper or lower surface of the balancer to set a position where the balancer is placed when the balancer is placed inside a mold to form the overmold.

A recess may be formed at a side surface of the balancer to prevent separation of the balancer from the overmold.

The height of the balancer may not be more than the thickness of the overmold.

The stainless steel may be austenite based stainless steel.

According to another aspect of the present invention, a head stack assembly comprises a swing arm, a suspension coupled to an end portion of the swing arm, a head slider which is a data read/write medium and mounted on an end portion of the suspension, and an overmold having a voice coil wound therearound and at least one balancer installed to adjust balance and provided at a position opposite to the head slider with respect to the center of rotation of the swing arm, wherein the balancer is formed of stainless steel and demagnetized through a thermal treatment after the stainless steel is processed to have a balancer shape.

The demagnetization thermal treatment may include a step to place the stainless steel having a balancer shape at a temperature between 950-1,150° C. for 30-120 minutes.

The overmold may be formed by resin mold in which the inside of a mold is filled with liquid resin and the resin is solidified, and a hole is formed in an upper or lower surface of the balancer to set a position where the balancer is placed when the balancer is placed inside the mold to form the overmold.

A recess may be formed at a side surface of the balancer to prevent separation of the balancer from the overmold.

The height of the balancer may not be more than the thickness of the overmold, and the balancer may be installed not to protrude from an upper or lower side of the overmold.

The stainless steel may be austenite based stainless steel.

The center of gravity of the balancer and the center of gravity of the overmold except for the balancer may be located in different sides with respect to an imaginary line passing the center of rotation of the head slider and the center of rotation of the swing arm.

A distance from the center of rotation of the swing arm to the balancer may not be more than 4.5 mm.

A plurality of arm blades may be stacked and each of the arm blades may include a single swing arm, a single suspension, and a single head slider.

According to another aspect of the present invention, a method for manufacturing a balancer comprises processing stainless steel to have a balancer shape, and demagnetizing the stainless steel having the balancer shape through a thermal treatment.

The demagnetization thermal treatment may include a step to place the stainless steel having a balancer shape at a temperature between 950-1,150° C. for 30-120 minutes.

The stainless steel may be austenite based stainless steel.

According to another aspect of the present invention, a method for manufacturing an overmold of a head stack assembly comprises processing stainless steel to have a balancer shape and demagnetizing the stainless steel having the balancer shape through a thermal treatment, placing the balancer inside a mold, and filling the inside of the mold with liquid resin and solidifying the liquid resin to form the overmold.

The demagnetization thermal treatment may include a step to place the stainless steel having a balancer shape at a temperature between 950-1,150° C. for 30-120 minutes.

The stainless steel may be austenite based stainless steel.

A protrusion to set a position where the balancer is placed may be formed on an inner surface of the mold and a hole is formed in an upper or lower surface of the balancer so that, when the balancer is placed inside the mold, the protrusion of the mold is inserted in the hole of the balancer.

A recess may be formed at a side surface of the balancer to prevent separation of the balancer from the overmold.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION OF THE PREFERRED EMBODIMENTS

Figure 1:
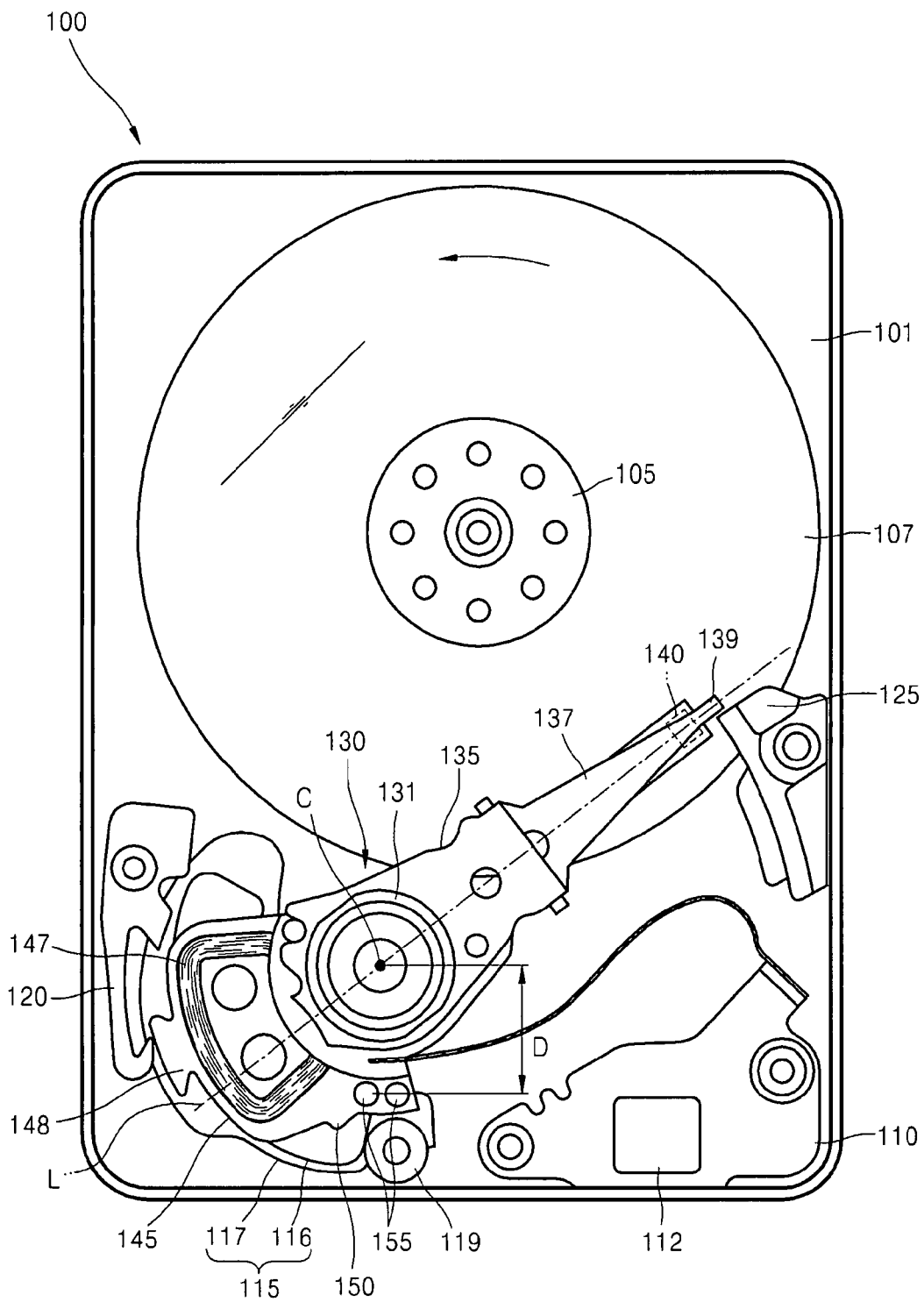
FIG. 1 is a plan view of an HDD having an HSA according to an exemplary embodiment of the present invention.

Reference will now be made in detail to the exemplary embodiments of the present invention, examples of which are illustrated in the accompanying drawings, wherein like reference numerals refer to the like elements throughout. Exemplary embodiments are described below to explain the present invention by referring to the figures.

Referring to FIG. 1, a hard disk drive (HDD) 100 having a head stack assembly (HSA) 130 according to an exemplary embodiment of the present invention includes a housing (not shown) consisting of a base member 101 and a cover member (not shown) coupled to the base member 101. In the housing, a spindle motor 105, a disk 107 that is a data storage medium, an HSA 130, and a voice coil motor (VCM) block 115. The spindle motor 105 to rotate the disk 107 at high speed is fixed to the base member 101. The disk 107 is coupled to the spindle motor 105 and rotates at high speed in a direction indicated by an arrow. The high speed rotation of the disk 107 causes air flow moving in the same direction indicated by the arrow on the surface of the disk 107.

The HSA 130 includes a head slider 140 where a magnetic head (not shown) to read/write data is formed. The head slider 140 moves to a particular position on the disk 107, in particular, a particular track, to write data on the disk 107 or read data from the disk 107. The HSA 130 includes a swing arm 135 pivoting around the center C of a pivot bearing 131 on a base member 101, a suspension 137 coupled to an end portion of the swing arm 135 and extending therefrom, and a head slider 140 mounted on an end portion of the suspension 137. The HSA 130 also includes an overmold 145 extending from a pivot bearing 131 in the opposite direction to the direction in which the swing arm 135 extends, and having a voice coil 147 wound therearound.

While the air flow generated by the high speed rotation of the disk 107 passes between the surface of the disk 107 and the surface of the head slider 140 facing the disk 107, a lift force acts on the head slider 140. The head slider 140 maintains a floating state at a height where the lift force and an elastic pressing force of the suspension 137 pressing the head slider 140 toward the disk 107 are balanced. In such a state, a magnetic head (not shown) formed on the head slider 140 performs a data read/write function with respect to the disk 107.

When the operation of the HDD 100 is stopped, the head slider 140 is out of the disk 107 and parked on a ramp 125 provided at the outer side of the disk 107. The suspension 137 includes an end-tap 139 at an end portion thereof. As the end-tap 139 contacts the ramp 125 and slides upward, the HSA 130 and the head slider 140 are parked.

The HDD 100 includes a latch 120 which locks the HSA 130 by interfering with a hook 148 formed on the overmold 145 when the HSA 130 is parked on the ramp 125. The latch 120 prevents damage to the head slider 140 and the disk 107 due to the external interference when the operation of the HDD 100 is stopped.

The VCM block 115 is fixed to the base member 101 and the overmold 145 is inserted in the VCM block 115. The VCM block 115 includes a magnet 116 arranged at each of the upper and lower sides of the overmold 145, and a yoke 117 supporting the magnet 116. The voice coil 147 of the overmold 145 generates an electromagnetic force by the interaction with the magnet 116. The electromagnetic force is used as a force rotating the HSA 130. The rotation of the HSA 130 is controlled by a servo control system.

The HSA 130 is electrically connected to a flexible printed circuit 110 that is connected to a main circuit board (not shown) arranged under the base member 101, through a connector 112 coupled to the flexible printed circuit 110. The flexible printed circuit 110 functions as a medium exchanging electric signals between the HSA 130 and the main circuit board.

A crash stopper 119 to restrict a range of counterclockwise pivot of the HSA 130 is provided on the HDD 100. When the HSA 130 pivots counterclockwise, as a collision portion 150 formed on the overmold 145 collides against the crash stopper 119, the rotation of the HSA 130 is mechanically stopped. Accordingly, in spite of the external interference, the collision between the HSA 130 and the spindle motor 105 is prevented.

Figure 2:
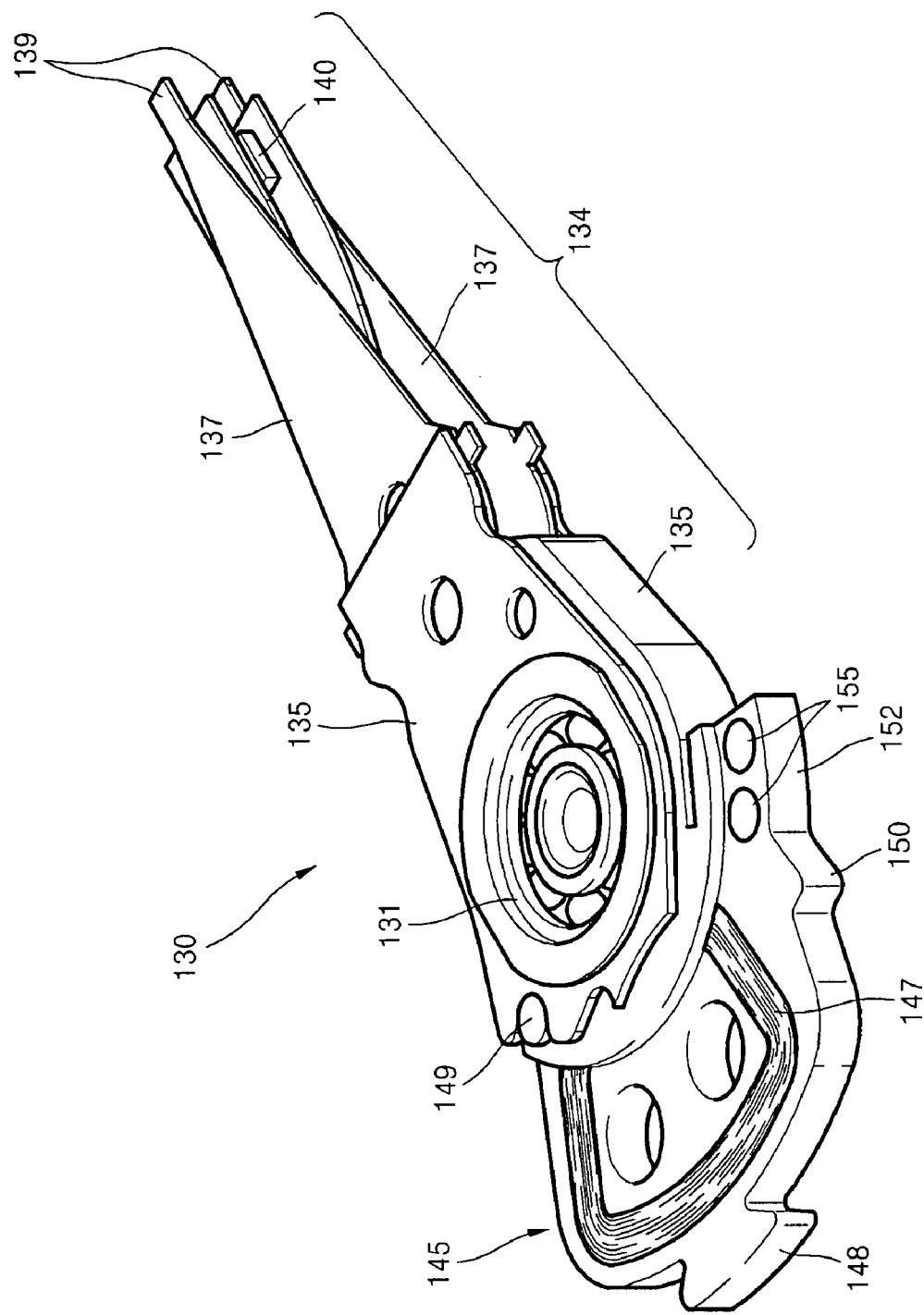
FIG. 2 is a perspective view of the HSA of FIG. 1.
Figure 3:
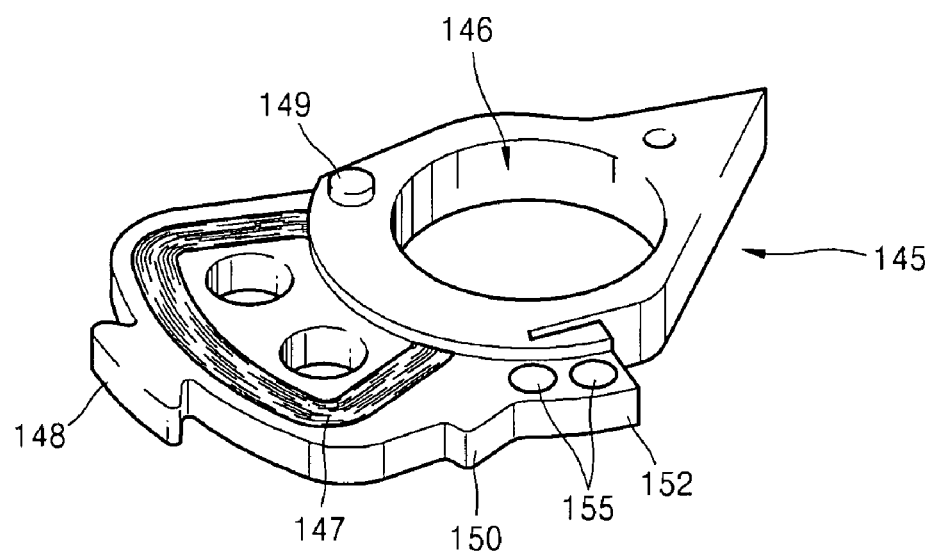
FIG. 3 is a perspective view of an overmold shown in FIG. 2.

FIG. 2 is a perspective view of the HSA of FIG. 1. FIG. 3 is a perspective view of an overmold shown in FIG. 2. Referring to FIGS. 2 and 3, the HSA 130 is a so-called unmounted type HSA in which the swing arm 135, the suspension 137, and the head slider 140 constitute an arm blade 134 and a pair of the arm blades 134 are stacked with respect to the overmold 145 interposed therebetween. The unmounted type HSA 130 is mainly employed in a compact HDD having the disk 107 of FIG. 1 whose diameter is less than 2.5 inches.

A pair of balancers 155 is installed on the overmold 145 of the HSA 130 to adjust balance of the HSA 130. To install the balancer 155, a balancer installation portion 152 is provided between a pivot bearing through hole 146 and the collision portion 150 of the overmold 145. Referring back to FIG. 1, the overmold 145 is positioned to be inclined to one side with respect to an imaginary line L passing the head slider 140 and the center C of the pivot bearing 131 that is the center of rotation of the swing arm 135. This can be confirmed by the voice coil 147 being positioned to be inclined to one side with respect to the imaginary line L. This inclination is to make the HSA 130 and the VCM block 115 arranged compacter. The overmold 145 inclined to one side with respect to the imaginary line L causes eccentricity of the HSA 130. To compensate for the eccentricity, the balancers 155 are located in the opposite area to an area where the overmold 145 is inclined with respect to the imaginary line L. In other words, the center of gravity of the pair of balancers 155 and the center of gravity of the overmold 145 except for the balancers 155 are located in different areas (in different sides and/or on different sides) with respect to the imaginary line L. A protrusion 149 in FIGS. 2 and 3 is to set a relative position of the overmold 145 with respect to the arm blade 134.

Referring to FIG. 1, the crash stopper 119 must not interfere with the balancers 155. Thus, in the compact HDD 100, the distance D from the center C of the pivot bearing 131 to the balancers 155 is limited to be within 4.5 mm and the weight of a material for the balancers 155 needs to be relatively great. Brass, bronze, and stainless steel are metallic materials having a relatively greater weight and a superior processing characteristic. Since the brass and bronze easily corrode, the stainless steel is preferably used as a material for the balancers 155. The stainless steel is largely divided into a ferrite based stainless steel and austenite based stainless steel. Since the ferrite based stainless steel that is ferromagnetic is likely to interfere with the magnet 116 of FIG. 1, the austenite based stainless steel that is paramagnetic is preferably used.

Figure 4:
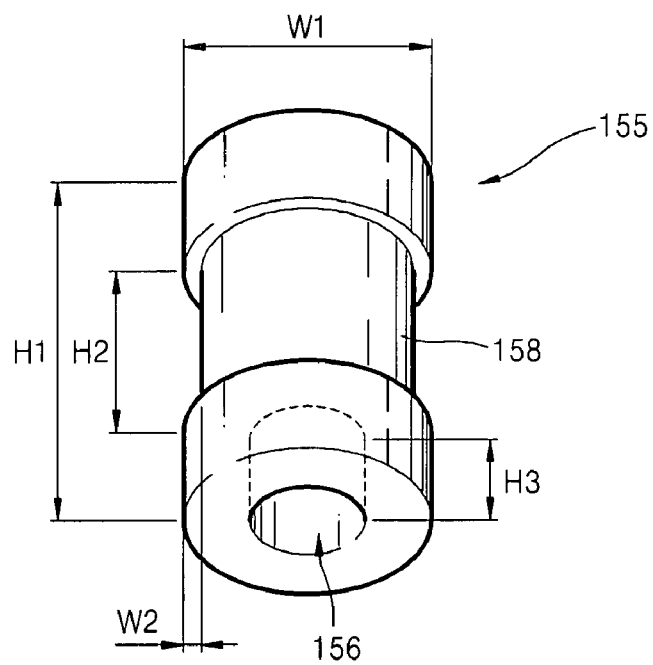
FIG. 4 is a perspective view of a balancer according to an exemplary embodiment of the present invention.
Figure 5:
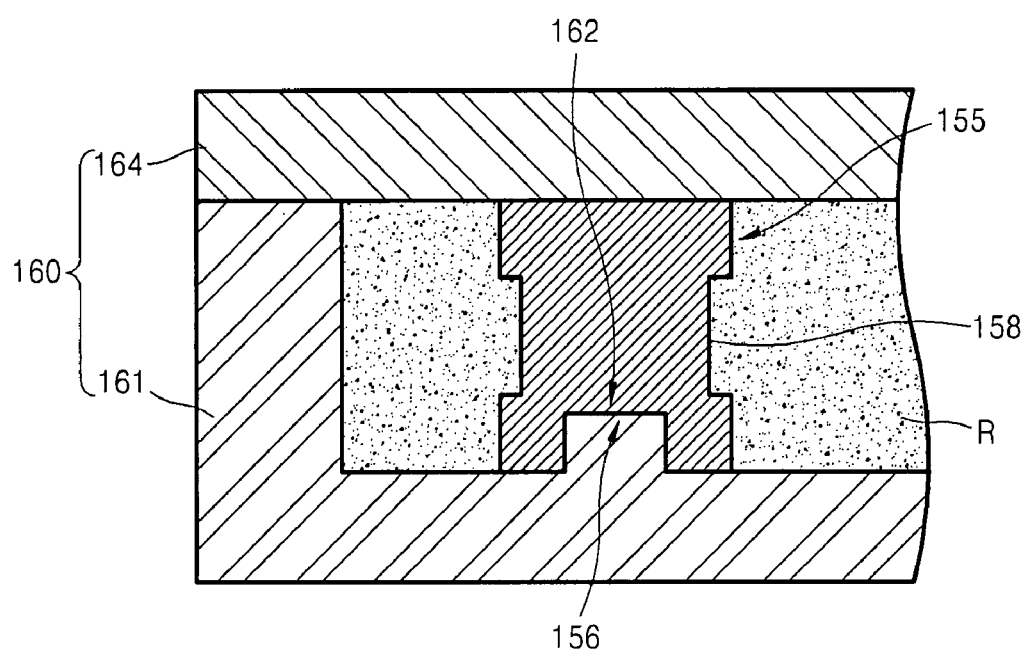
FIG. 5 is a cross-sectional view of the balancer of FIG. 4 placed in a mold for forming an overmold.

FIG. 4 is a perspective view of the balancer 155 according to an exemplary embodiment of the present invention. FIG. 5 is a cross-sectional view of the balancer 155 of FIG. 4 placed in a mold for forming the overmold 145. Referring to FIGS. 4 and 5, the balancer 155 is a cylindrical member having a weight of about 1.5 mg, a diameter W1 of about 0.7 mm, and a height H1 of about 0.6 mm. The height H1 of the balancer 155 is set to be the same as or not more than the thickness of the balancer installation portion 152 of the overmold 145 of FIG. 2, so that the balancer 155 does not protrude from the upper or lower side of the balancer installation portion 152. This is to minimize a possibility of the balancer 155 interfering with the magnet 116 of FIG. 1.

A recess 158 having a height H2 of about 0.25 mm and a depth W2 of about 0.05 mm is formed on the side surface of the balancer 155. The recess 158 has a function to hold the balancer 155 in the balancer installation portion 152 of FIG. 2 not to be separated therefrom. A hole 156 having a depth H3 of about 0.15 mm is formed in the lower surface of the balancer 155. The hole 156 is used to set the position of the balancer 155 when the balancer 155 is placed inside a mold 160 of FIG. 5 to form the overmold 145 of FIG. 3. The hole 156 can be formed in the upper surface of the balancer 155 unlike the present exemplary embodiment.

The shape of the balancer 155 is formed by a mechanical processing method such as stamping processing. Even when austenite based stainless steel is used as a material for the balancer 155, as strong stress is applied to the material during the process of forming the shape of the balancer 155, the internal structure of the austenite based stainless steel is changed to martensite phase so that the balancer 155 becomes ferromagnetic.

Thus, to remove the magnetism generated by the shape processing, a demagnetization thermal treatment is performed to the stainless steel having the shape of the balancer 155. The demagnetization thermal treatment includes a step of placing the stainless steel having the shape of the balancer 155 having ferromagnetism at a temperature between 950° C.-1,150° C. for 30 minutes-120 minutes. After the demagnetization thermal treatment, the balancer 155 is reduced to be paramagnetic so that interference with the magnet 116 of FIG. 1 is prevented.

Referring to FIGS. 3 and 5, the balancer 155 manufactured (made) by the above-described method can be forcibly installed in the balancer installation portion 152 of the overmold 145. However, since the balancer installation portion 152 having a small thickness can be deformed, the balancer 155 can be installed on the balancer installation portion 152 of the overmold 145 by insert molding like a method of installing the voice coil 147 on the overmold 145.

The overmold 145 is formed by injecting liquid resin R to fill the inside of a mold 160, which includes a mold base 161 and a mold cover 164 and solidifying the resin R. The voice coil 147 and the balancer 155 are placed inside the mold 160 before the mold 160 is filled with the liquid resin R. A protrusion 162 is formed on an inner surface of the mold base 161 to set a position where the balancer 155 is placed and not to disturb the position. The size of the protrusion 162 corresponds to the size of the hole 156 of the balancer 155. The balancer 155 is placed on the mold base 161 such that the protrusion 162 is inserted in the hole 156 of the balancer 155. The inside of the mold 160 is sealed by covering the mold cover 164 and the liquid resin R is injected into the mold 160. After the resin R is solidified, the mold base 161 and the mold cover 164 are separated to obtain the overmold 145. Since the resin R fills the recess 158 having a height H2 of about 0.25 mm and a depth W2 of about 0.05 mm without a gap and then solidified, the balancer 155 is not separated from the overmold 145.

Since the balancer according to the present invention is formed of stainless steel, a manufacturing cost is low. Since the balance is reduced to paramagnetism by the demagnetization thermal treatment, there is no possibility of interfering with the magnet. Also, since the balancer is relatively small and light, the balance of the HSA can be easily adjusted without much change in the shape of the HSA. Thus, the balancer is useful for the adjustment of the balance of an HSA for a compact HDD which has a limitation in its shape due to a limited space.

Although a few exemplary embodiments of the present invention have been shown and described, it would be appreciated by those skilled in the art that changes may be made in these exemplary embodiments without departing from the principles and spirit of the invention, the scope of which is defined in the claims and their equivalents.

What is claimed is:

1. A balancer installed on an overmold of a head stack assembly to adjust balance of the head stack assembly, wherein:
   the balancer is formed of stainless steel and demagnetized through a thermal treatment after the stainless steel is processed to form the shape of the balancer,
   a recess is formed at a side surface of the balancer to prevent separation of the balancer from the overmold,
   the overmold is positioned to be inclined to one side with respect to a line passing through a head slider and a center of a pivot bearing of the head stack assembly, and
   wherein the center of gravity of the balancer and the center of gravity of the overmold except for the balancer are located on different sides of a line passing the center of rotation of the head slider and the center of the pivot bearing of the head stack assembly.

2. The balancer of claim 1, wherein the demagnetization thermal treatment includes a step to place the stainless steel having the balancer shape at a temperature between 950° C.-1,150° C. for 30 minutes-120 minutes.

3. The balancer of claim 1, wherein a hole is formed in an upper surface or lower surface of the balancer to set a position where the balancer is placed when the balancer is placed inside a mold to form the overmold.

4. The balancer of claim 1, wherein the height of the balancer is not more than the thickness of the overmold.

5. The balancer of claim 1, wherein the stainless steel is austenite based stainless steel.

6. A head stack assembly comprising:
   a swing arm;
   a suspension coupled to an end portion of the swing arm;
   a head slider which is a data read/write medium and mounted on an end portion of the suspension; and
   an overmold having a voice coil wound therearound and at least one balancer installed to adjust balance and provided at a position opposite to the head slider with respect to the center of rotation of the swing arm, wherein the balancer is formed of stainless steel and demagnetized through a thermal treatment after the stainless steel is processed to form the shape of the balancer, and a recess is formed at a side surface of the balancer to prevent separation of the balancer from the overmold, the overmold is positioned to be inclined to one side with respect to a line passing through the center of rotation of the head slider and the center of rotation of the swing arm, and wherein the center of gravity of the at least one balancer and the center of gravity of the overmold except for the at least one balancer are located on different sides of the line passing the center of rotation of the head slider and the center of rotation of the swing arm.

7. The head stack assembly of claim 6, wherein the demagnetization thermal treatment includes a step to place the stainless steel having a balancer shape at a temperature between 950° C.-1,150° C. for 30 minutes-120 minutes.

8. The head stack assembly of claim 6, wherein a hole is formed in an upper or lower surface of the balancer to set a position where the balancer is placed when the balancer is placed inside a mold to form the overmold, and the overmold is formed by using a resin in which the inside of the mold is filled with liquid resin and the resin is solidified.

9. The head stack assembly of claim 6, wherein the height of the balancer is not more than the thickness of the overmold, and the balancer is installed not to protrude from an upper side or lower side of the overmold.

10. The head stack assembly of claim 6, wherein the stainless steel is austenite based stainless steel.

11. The head stack assembly of claim 6, wherein a distance from the center of rotation of the swing arm to the balancer is not more than 4.5 mm.

12. The head stack assembly of claim 6, wherein a plurality of arm blades are stacked and each of the arm blades includes a single swing arm, a single suspension, and a single head slider.

* * * * *

UNITED STATES PATENT AND TRADEMARK OFFICE
CERTIFICATE OF CORRECTION

| | | |
|---|---|---|
| PATENT NO. | : 7,876,533 B2 | |
| APPLICATION NO. | : 11/704270 | |
| DATED | : January 25, 2011 | |
| INVENTOR(S) | : Sang-chul Shin et al. | |

It is certified that error appears in the above-identified patent and that said Letters Patent is hereby corrected as shown below:

Title Page, Column 2, Item [57] (Abstract), Line 1, delete the second occurrence of "an" and insert --a--, therefor.

Signed and Sealed this
Thirty-first Day of May, 2011

David J. Kappos
*Director of the United States Patent and Trademark Office*